Oct. 27, 1931.  J. KARITZKY  1,829,357
SPRING TOGGLE
Filed July 9, 1930   2 Sheets-Sheet 1
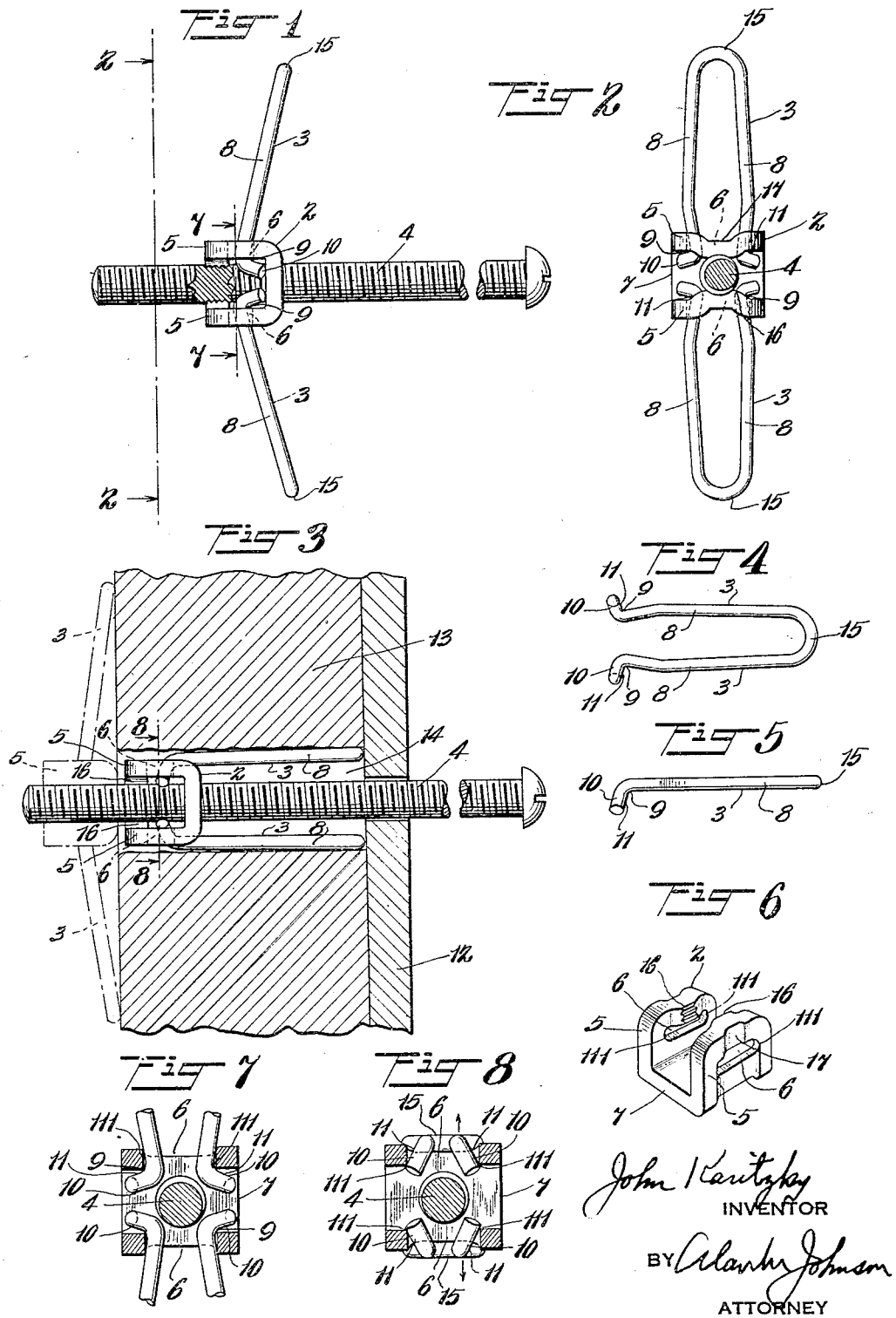

Oct. 27, 1931.    J. KARITZKY    1,829,357
SPRING TOGGLE
Filed July 9, 1930    2 Sheets-Sheet 2
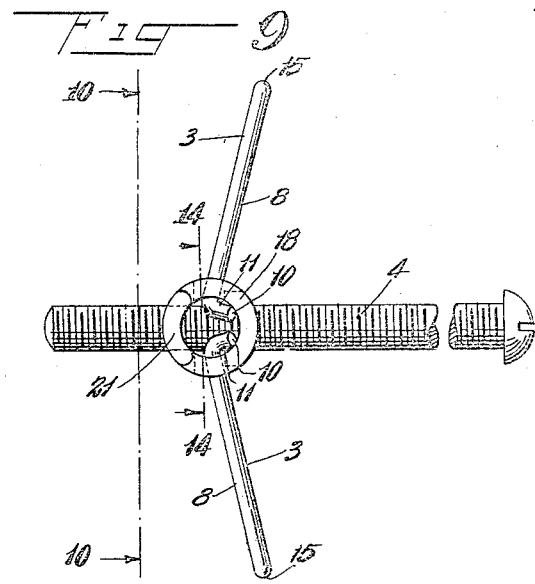
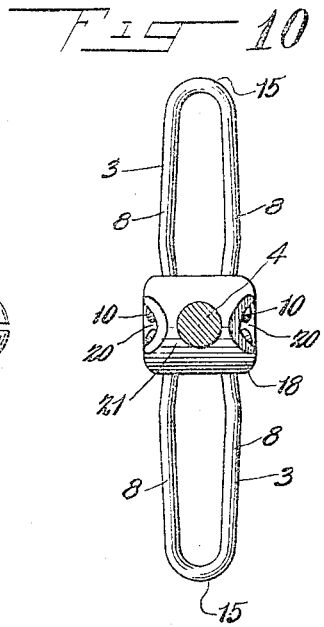
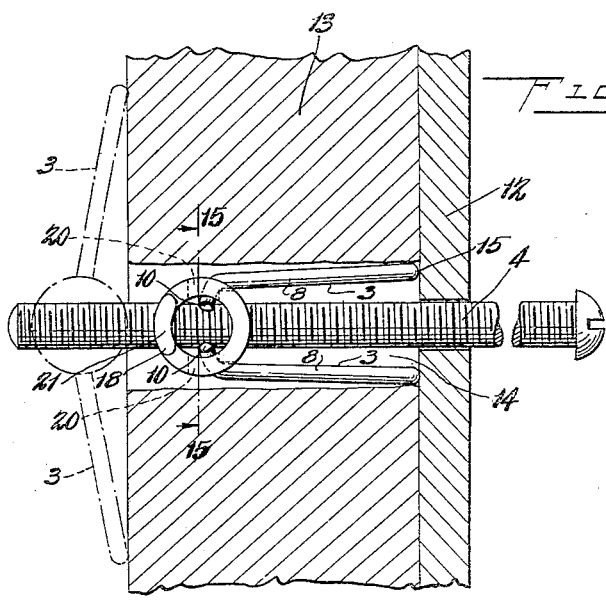
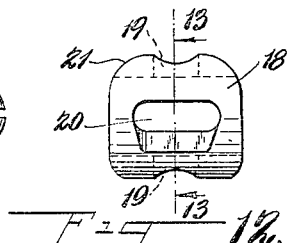
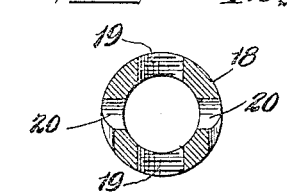
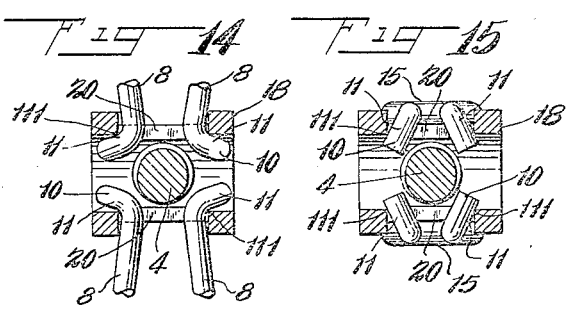
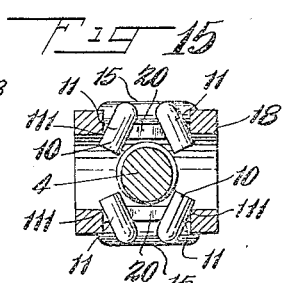
John Karitzky
INVENTOR
BY Alexander Johnson
ATTORNEY Patented Oct. 27, 1931

1,829,357

UNITED STATES PATENT OFFICE

JOHN KARITZKY, OF GARWOOD, NEW JERSEY, ASSIGNOR TO HENRY B. NEWHALL CORPORATION, OF GARWOOD, NEW JERSEY, A CORPORATION OF NEW JERSEY

SPRING TOGGLE

Application filed July 9, 1930. Serial No. 466,636.

My invention relates to toggle bolts, which are well known in the trade, and more particularly to a spring toggle bolt wherein the spring of the toggle is obtained by subjecting the arms to strains when they are bent back 90° to permit their insertion in the hole of the support.

My invention further relates to certain combinations, sub-combinations, articles of manufacture and details of construction, all of which will be more fully hereinafter described and pointed out in the claims.

In the figures I have shown different embodiments of my invention, the same reference numerals refer to similar parts of the several figures.

Fig. 1 is a side elevation, with the spring arms in their normal extended position;

Fig. 2 is a vertical section on line 2—2 of Fig. 1, looking in the direction of the arrows;

Fig. 3 is a horizontal section;

Fig. 4 is a plan of one of the spring arms;

Fig. 5 is a side elevation of one of the spring arms;

Fig. 6 is a detail perspective view of the preferred form of nut;

Fig. 7 is a vertical section on line 7—7 of Fig. 1;

Fig. 8 is a section on line 8—8 of Fig. 3;

Figures 9 to 15 inclusive illustrate a modification. Fig. 9 is a side elevation;

Fig. 10 is a vertical section on line 10—10 of Fig. 9 looking in the direction of the arrows;

Fig. 11 is a horizontal section;

Fig. 12 is a detailed side elevation;

Fig. 13 is a section on line 13—13 of Fig. 12;

Fig. 14 is a section on line 14—14 of Fig. 9, looking in the direction of the arrows;

Fig. 15 is a section on line 15—15 of Fig. 11.

In the preferred embodiment of my invention, shown in Figures 1 to 8 inclusive, I is a spring toggle formed of the nut 2, the pair of spring arms 3, 3, and the stove or other bolt 4.

The nut 2 is preferably formed of stamped sheet metal and provided with a base 7 and opposed flanges 5, 5. In each one of the flanges 5, 5 an enlarged slot 6 is cut, or otherwise formed, the two slots 6, 6 being aligned with each other.

The spring arms 3, 3 are preferably formed of spring wire bent back on itself to form the legs 8, 8. The ends of the legs 8, 8 are bent at 9, 9 to form seats, the very ends of each leg 8 being bent out at an angle to form cam hooks, or fingers 10, 10 having cam services 11, 11.

In assembling the spring arms 3 and the nut 2, the cam fingers or hooks 10, 10 of each spring arm are brought adjacent to each other and then slipped into one of the open slots 6, the adjacent cam fingers of each spring arm being located in one of the cam slots 6. Upon releasing the pressure on the cam fingers 10, 10 after being forced through the slot 6, they will spread apart, and the cam fingers or hooks 10, 10 will hold the spring arms and the nut 2 together, the seat 9 of the spring arm cooperating with the side of the slot 6, 6.

In their normal position the spring arms 3, 3 extend out from the nut 2, as shown in Figures 1 and 2.

To secure the work 12, or other object, to the wall, ceiling or other support 13, a hole 14 is drilled or otherwise formed in the support which is usually, brick, masonry, stone, terra cotta, tile, concrete or other similar material.

The stove or other bolt 4 is threaded into the base 7 of the nut 2, which is provided with female threads to cooperate with the male threads of the bolt. The two spring arms 3, 3 are then bent down, usually by the thumb and forefinger of the operator, until parallel to the bolt 4 as shown in Figure 3.

In bending down these spring arms 3, 3, into the position shown in Fig. 3, the hook ends 10, 10 of the spring legs 8, 8 are caused to approach each other as the movable cam surfaces 11, 11 on the hook or fingers 10, 10, are forced under the fixed surfaces 111, 111 of the slots 6, 6. In doing this, energy is stored up in the spring arms 3, 3 which is released the moment the ends 15, 15 of the spring arms 3, 3 escape from the hole 14, permitting them to fly out into the position shown by the dotted lines in Fig. 3. This is due to the fact that the moment pressure is removed from the spring arms 3, 3 their resiliency will cause the cam or inclined surfaces 11, 11 to move with relation to the fixed surfaces 111, 111 on the nut, permitting the parts to assume their normal expanded position shown in full lines in Figures 1 and 2, and in dotted lines in Fig. 3. By then screwing up on the stove or other bolt 4 the work 12, whatever it may be, can be securely held to the face of the wall, ceiling or other support 13.

Under a very excessive load there might be a tendency for the free ends of the flanges 5, 5 to approach each other, leading to a weakening of the fastening. Preferably, though not necessarily, I provide the free ends of the flanges 5, 5 with abutments or ridges 16, 16 to engage with opposite sides of the bolt 4. It is obvious that when these abutments or ridges are employed no excessive strains can cause the free ends of the flanges to approach each other without crushing the bolt 4. To permit free movement of the bolt while in engagement with the ridges or abutments, I preferably, though not necessarily, form the abutments or ridges with interrupted screw threads 116, 116 which will cooperate with the threads of the bolt 4.

The ridges or abutments 16, 16 may be variously formed. I have shown them formed by stamping or otherwise forming a hollow or depression 17, on the outside of each flange, which will form a corresponding ridge or abutment 16 on the inside of the same flange.

In Figures 9 to 15 I have illustrated a modification. In this form the spring arms 3, 3 with their legs 8, 8 and cam hooks or fingers 10, 10 having inclined or cam surfaces 11, 11 are the same as in the other form.

In this form the nut 18 is cylindrical. It is provided with female threads 19, 19 to cooperate with the bolt 4. Ninety degrees from the screw threaded portions 19, 19 I provide the cylindrical nut with open slots 20, 20 for the reception of the hooked ends of the spring arms 3, 3, as in the other form.

These spring arms normally are in the position shown in Figures 9 and 10. When they are forced down to become approximately parallel to the bolt 4, Fig. 11, so as to insert the spring toggle into the hole 14, in the wall, ceiling or the support 13, the hooked ends of each spring arm are forced towards each other by causing the cam surfaces 11, 11 on the spring arms to ride in contact with the fixed surfaces 111, 111 on the side of the slot 20, 20, thereby storing up energy, as previously described, which is released the moment that the ends 15, 15 of the spring arms escape to the rear of the hole 14, permitting them to fly out into the position shown by dotted lines in Fig. 11.

It will be clear that this nut 18, will be extremely strong and that, due to its cylindrical form, any excessive strains, due to an excessive load on the toggle, will be counteracted by the integral arched portion 21 of the nut.

Having thus described this invention in connection with an illustrative embodiment thereof, to the details of which I do not desire to be limited, what is claimed as new and what is desired to secure by Letters Patent is set forth in the appended claims.

What I claim is:—

1. The combination in a spring toggle of a nut provided with opposed aligned slots, integral resilient spring arms mounted in the slots both ends of each resilient spring arm mounted in a common slot, means to place the resilient spring arms under tension when they are moved substantially parallel to a bolt cooperating with the nut, and a bolt.

2. The combination in a spring toggle of a nut provided with a base and side portions, the side portions being provided with enlarged slots each slot adapted to receive the two divided ends of a spring arm, and resilient spring arms having two divided ends mounted in the slots and provided with means to place the spring arms under tension when they are brought substantially parallel to a bolt, and a bolt to cooperate with the nut.

3. The combination in a spring toggle of a nut provided with a base and two opposed flanges each flange provided with enlarged slots, two spring arms each arm having two divided legs, both legs of one spring arm being mounted in one of the slots in one flange, said spring arms being provided with means cooperating with the walls of the slot to cause the spring arms to be placed under tension when they are brought into substantial parallel relation to the operating bolt, and a bolt to cooperate with the nut.

4. The combination in a spring toggle of a nut provided with a base and two opposed flanges each flange provided with enlarged slots, two spring arms each arm having two legs, both legs of one spring arm being mounted in one of the slots in one flange, said spring arms being provided with inclined surfaces adapted to cooperate with the walls of the slot to cause the spring arms to be placed under tension when they are brought into substantial parallel relation to the operating bolt, and a bolt to cooperate with the nut.

5. The combination in a spring toggle of a nut provided with a base and two opposed flanges each flange provided with enlarged slots, two spring arms each arm having two legs, both legs of one spring arm being mounted in one of the slots in one flange, said spring arms being provided with hooks adapted to engage with the base of the nut and with means cooperating with the walls of the slots to cause the spring arms to be placed under tension when they are brought into substantial parallel relation to the operating bolt, and a bolt to cooperate with the nut.

6. The combination in a spring toggle of a nut provided with a base and two opposed flanges each flange provided with enlarged slots, two spring arms each arm having two divided legs, both ends of each divided leg of one spring arm being mounted in one of the slots in one flange, said spring arms being provided with means cooperating with the walls of the slot to cause the spring arms to be placed under tension when they are brought into substantial parallel relation to the operating bolt, and means to brace the flanges.

7. The combination in a spring toggle of a nut provided with a base and two opposed flanges each flange provided with enlarged slots, two spring arms each arm having two legs, both legs of one spring arm being mounted in one of the slots in one flange, said spring arms being provided with means cooperating with the walls of the slot to cause the spring arms to be placed under tension when they are brought into substantial parallel relation to the operating bolt, and means on the flanges adapted to engage with the bolt to brace the flanges and to prevent them getting out of line.

8. The combination in a spring toggle of a nut provided with a base and two opposed flanges each flange provided with enlarged slots, two spring arms each arm having two legs, both legs of one spring arm being mounted in one of the slots in one flange, said spring arms being provided with means cooperating with the walls of the slot to cause the spring arms to be placed under tension when they are brought into substantial parallel relation to the operating bolt, and abutments or ridges on the flanges adapted to engage with the bolts to prevent bending of the flanges under excessive load on the toggle.

9. The combination in a spring toggle of a nut provided with a base and two opposed flanges each flange provided with enlarged slots, two spring arms each arm having two legs, both legs of one spring arm being mounted in one of the slots in one flange, said spring arms being provided with means cooperating with the walls of the slot to cause the spring arms to be placed under tension when they are brought into substantial parallel relation to the operating bolt, and threaded abutments or ridges on the flanges adapted to engage with the screw threads on the bolts to prevent bending of the flanges under excessive load on the toggle and preventing marring of the threads of the bolt.

10. A new article of manufacture for spring toggle bolts of a U-shape nut having a base and two up turned flanges, the flanges being provided with aligned enlarged slots for the reception of spring arms, and means on the up turned flanges to engage with a bolt to keep the flanges in proper position regardless of the load on the spring toggle.

11. The combination in a spring toggle of a nut provided with opposed aligned slots, integral resilient split spring arms mounted in the slots both ends of each resilient spring arm mounted in a common slot, and means to cause the two split ends of each spring arm to approach each other to place the arms under tension when they are swung down into line with a cooperating bolt, and a bolt.

12. The combination in a spring toggle of a nut provided with opposed aligned slots, integral resilient split spring arms mounted in the slots both ends of each resilient spring arm mounted in a common slot, and inclined cooperating means to cause the two split ends of each spring arm to approach each other to place the arms under tension when they are swung down into line with a cooperating bolt, and a bolt.

JOHN KARITZKY.